US009208302B2

(12) United States Patent
Kannavara et al.

(10) Patent No.: US 9,208,302 B2
(45) Date of Patent: Dec. 8, 2015

(54) MULTI-FACTOR AUTHENTICATION USING BIOMETRIC DATA

(71) Applicant: Intel Corporation, Santa Clara, CA (US)

(72) Inventors: Raghudeep Kannavara, Hillsboro, OR (US); Keith L. Shippy, Tempe, AZ (US); Michael Lonergan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 13/631,749

(22) Filed: Sep. 28, 2012

(65) Prior Publication Data

US 2014/0095884 A1    Apr. 3, 2014

(51) Int. Cl.

| G06F 21/00 | (2013.01) |
|---|---|
| H04L 9/32 | (2006.01) |
| G06F 7/04 | (2006.01) |
| G06F 15/16 | (2006.01) |
| G06F 17/30 | (2006.01) |
| H04L 29/06 | (2006.01) |
| G06F 21/32 | (2013.01) |

(52) U.S. Cl.
CPC .............. *G06F 21/32* (2013.01); *G06F 21/00* (2013.01); *H04L 9/3231* (2013.01); *H04L 63/0861* (2013.01); *G06F 2221/2117* (2013.01)

(58) Field of Classification Search
CPC ... H04L 9/0662; H04L 9/3226; H04L 9/3236; H04L 63/083; G06F 21/6281; G06F 7/588
USPC ............ 382/115; 713/182, 186, 189; 380/44; 708/250, 254
See application file for complete search history.

(56) References Cited

U.S. PATENT DOCUMENTS

| 6,687,375 | B1 * | 2/2004 | Matyas et al. ................... 380/45 |
|---|---|---|---|
| 6,993,542 | B1 * | 1/2006 | Meiyappan ................... 708/250 |
| 7,524,245 | B2 * | 4/2009 | Schneier et al. ............... 463/29 |
| 7,841,000 | B2 * | 11/2010 | Kawano et al. ................. 726/18 |
| 8,060,915 | B2 * | 11/2011 | Voice et al. ....................... 726/3 |
| 8,189,778 | B2 * | 5/2012 | Zhang ............................. 380/44 |
| 8,542,095 | B2 * | 9/2013 | Kamei ......................... 340/5.82 |
| 2002/0087890 | A1 | 7/2002 | Chan et al. |
| 2005/0154885 | A1 * | 7/2005 | Viscomi et al. ............... 713/165 |
| 2006/0075255 | A1 | 4/2006 | Duffy et al. |
| 2008/0209226 | A1 | 8/2008 | Venkatesan et al. |
| 2009/0007257 | A1 | 1/2009 | Hirata et al. |
| 2011/0126024 | A1 | 5/2011 | Beatson et al. |
| 2011/0314285 | A1 | 12/2011 | Hirata et al. |

FOREIGN PATENT DOCUMENTS

WO    2013095521 A1    6/2013

OTHER PUBLICATIONS

International Search Report and Written Opinion received for PCT Application No. PCT/US2013/062315, mailed on Jan. 17, 2014, 12 pages.

* cited by examiner

*Primary Examiner* — Saleh Najjar
*Assistant Examiner* — Feliciano Mejia
(74) *Attorney, Agent, or Firm* — Barnes & Thornburg LLP (57) ABSTRACT

Technologies for enabling biometric multi-factor authentication includes a transform selector value, a transform function that uses the transform selector value and a biometric user identifier as input, a salt derived from the output of the transform function, and a cryptographic hash function that generates a hash value based on the salt and a non-biometric user identifier.

32 Claims, 6 Drawing Sheets

MULTI-FACTOR AUTHENTICATION USING BIOMETRIC DATA

BACKGROUND

Multi-factor authentication is an approach to computerized security procedures that requires the user to provide more than one form of verification to prove their identity in order to gain access to sensitive data or computer systems. Commonly-used forms of verification include knowledge-based verification data (e.g., something the user knows, such as a password or Personal Identification Number) and token-based verification data (e.g., something the user has, such as a private key, security token or smart card). More recently, efforts have been undertaken to use biometric data for security purposes.

BRIEF DESCRIPTION

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "an embodiment," "illustrative," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
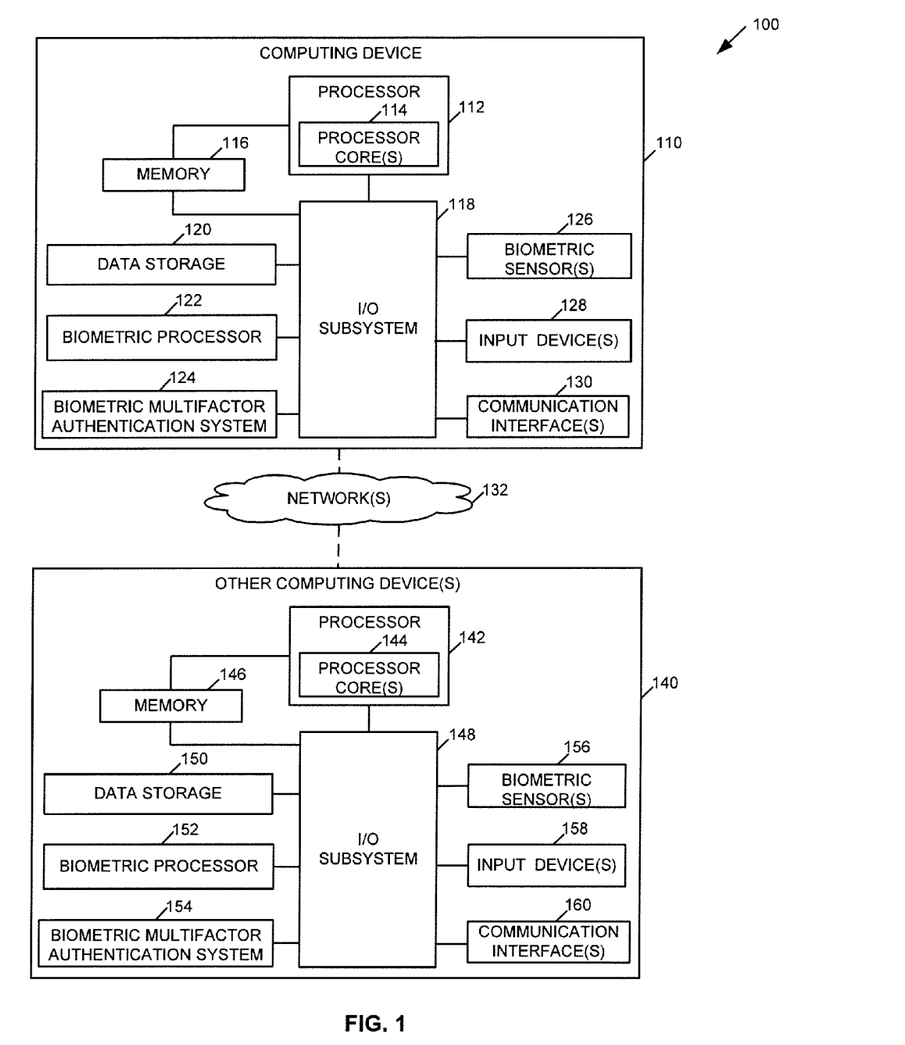
FIG. 1 is a simplified block diagram of at least one embodiment of a biometric multi-factor authentication system.

Referring now to FIG. 1, a biometric multi-factor authentication system ("system") 124 is embodied in an illustrative computing environment 100. As discussed in more detail below, the system 124 can authenticate the identity of a person who desires use of a computer system based on a combination of identifying credentials supplied by the user (e.g., a biometric user identifier and a non-biometric user identifier), and a system-generated input, referred to herein as a "transform selector value." Generally speaking, "biometric" data refers to distinctive human characteristics or traits that can be captured electronically in such a way that they can be used to identify individual persons. Some examples of human features that can be electronically captured to provide biometric data include the human iris or retina, fingerprints, palm prints, voice, a variety of facial features, and/or others. Some examples of non-biometric user identifiers include passwords, personal identification numbers, keys, security tokens, ID cards, and/or others (e.g., something a user has or something the user knows).

As described in detail below, the system 124 uses a biometric user identifier, a non-biometric user identifier, and the transform selector value to generate a salt. The system 124 uses the salt to generate a secure form of the user's identifying credentials (e.g., a hash value), which is stored in a secure memory location for later use in authentication. When a user attempts access to a protected computer or data, the system 124 requires the user to input a second instance of his or her identifying credentials (e.g., the biometric user identifier and the non-biometric user identifier). These values are used by the system 124 to generate a second version of the secure form of the user's identifying credentials (e.g., a second hash value). To authenticate the user, the system 124 compares the two versions of the secure form of the user's identifying credentials. If the versions do not match (e.g., within an acceptable tolerance range), the user may be denied access to the protected computer, data, or portions thereof.

In this way, biometric multi-factor authentication can be accomplished without the need to store the user's biometric data and without requiring the salt to be stored. This allows the user to re-use the same biometric data (e.g., he or she can use the same finger to generate a fingerprint) if needed in the future, because the system 124 uses the non-biometric identifier rather than the biometric data as the primary identifier. For this reason as well, standard cryptographic hashing algorithms (such as Secure Hash Algorithms, e.g., SHA-256, etc.) can be used to secure the biometric data. In addition, the use of the salt as described herein eliminates the need for highly exact reproductions of the biometric data.

The system 124 includes some components that are normally associated with biometric systems, such as one or more biometric sensors ("sensors") 126 and a biometric processor 122. The sensors 126 include whatever sensor(s) and/or other equipment or devices that are required to electronically capture the biometric data used by the system 124. For example, the biometric sensors 126 may include a camera, fingerprint scanner, or microphone. The biometric processor 122 includes electronic components that are used to digitize the biometric data that is captured by the sensors 126, such as analog to digital converters, digital signal processors, and the like.

As shown in FIG. 1, the computing environment 100 may include one or more computing devices 110, 140 that may be in communication via one or more network(s) 132. As such, the illustrative system 124 can include one or more components that are local to the computing device 110 and/or one or more components 154 that are distributed across one or more of the other computing devices 140. For example, enrollment of a user in the system 124 may occur at one of the computing devices 110, 140 while authentication of the user may occur at any time thereafter at the same or another of the computing devices 110, 140, and revocation of a user may occur at the same or yet another of the computing devices 110, 140.

The illustrative computing device 110 is embodied as at least one processor 112, a memory 116, an input/output (I/O) subsystem 118, one or more data storage devices ("storage") 120, one or more input devices 128, and one or more communication interfaces 130; and includes or is operably coupled to the sensors 126. The computing device 110 may be embodied in or as any type of computing device, such as, for example, a desktop computer system, a laptop or tablet computer system, a server, an enterprise computer system, a network of computers, a handheld or otherwise mobile computing device, or other electronic device, depending on the particular application of the system 124.

The illustrative processor 112 includes one or more processor cores or logical sections of a single core 114. The processor 112 and/or its cores 114 include, or are otherwise communicatively coupled to, the memory 116. Portions of the memory 116 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The processor 112 is also communicatively coupled to the I/O subsystem 118. Although not specifically shown, the I/O subsystem 118 typically includes a memory controller subsystem, an input/output controller subsystem, and a firmware device. Of course, in other embodiments, I/O subsystems having other configurations may be used. For example, in some embodiments, the I/O subsystem 118 may form a portion of a system-on-a-chip (SoC) and be incorporated, along with the processor 112 and other components of the computing device 110, on a single integrated circuit chip. As such, it will be appreciated that each component of the I/O subsystem 118 may be located on a common integrated circuit chip in some embodiments.

The illustrative I/O subsystem 118 is communicatively coupled to the storage 120. Portions of the storage 120 may be embodied as any suitable device for storing data and/or instructions, such as disk storage (e.g. hard disks), memory cards, memory sticks, and/or others. In some embodiments, portions of the biometric processor 122 and the system 124 are at least temporarily embodied in the storage 120. During execution, portions of the biometric processor 122 and/or the system 124 may be loaded into the memory 120 or cache memory for faster processing or other reasons. In other embodiments, portions of the biometric processor 122 and/or the system 124 may be embodied as electrical circuitry or machine-executable logic units. That is, portions of the biometric processor 122 and/or the system 124 may be embodied as software, firmware, hardware, and/or a combination thereof, in various embodiments of the computing device 110, 140.

The I/O subsystem 118 is also communicatively coupled to the above-described sensors 126, the input devices 128 and the communication interfaces 130. The input devices 128 may include, for example, a touchscreen display, a keypad or keyboard, a microphone, and/or any other suitable mechanism to enable a person to input a non-biometric user identifier. The communication interfaces 130 may be embodied as any communication circuitry, device, or combination thereof, capable of enabling communications between the computing device 110 and other computing devices 140 via the network(s) 132. The communication interfaces 130 may be configured to use any one or more forms of communication technology (e.g., wireless or wired communications) and associated protocols (e.g., Ethernet, BLUETOOTH, WI-FI, etc.) to effect such communication.

While not specifically shown, the I/O subsystem 118 may be communicatively coupled to one or more peripheral devices, such as graphics and/or video adaptors, displays, printers, data storage devices, and/or other peripheral devices, depending upon, for example, the intended use of the computing device 110. Further, various embodiments of the computing device 110 may include other components, subcomponents, and devices not illustrated in FIG. 1 for clarity of the description.

Each of the network(s) 132 may be embodied as any type of wired and/or wireless telecommunications network. For example, a network 132 may be embodied as or otherwise include one or more public or private cellular networks, telephone, Digital Subscriber Line (DSL) or cable networks, local or wide area networks, publicly available global networks (e.g., the Internet), or any combination thereof. Additionally, any of the network(s) 132 may include any number of additional devices as needed to facilitate communication between or among the computing devices 110, 140, such as routers, switches, intervening computers and/or others. Any suitable communication protocol (e.g., TCP/IP) may be used to effect communication over any of the network(s) 132, depending on, for example, the particular type or configuration of the particular network 132.

In general, the components of the computing device 110 are communicatively coupled as shown in FIG. 1, by one or more signal paths. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

The components of the illustrative computing device 140 are functionally similar or analogous to the computing device 110, and components thereof generally correspond to the components of the computing device 110 described above having the same names. Thus, while enumerated separately in FIG. 1, the components 142, 144, 146, 148, 150, 152, 154, 156, 158, 160 are not separately described for clarity of the description. It should be understood, however, that the computing devices 110, 140 and/or components thereof need not take the same form in any or all embodiments. For example, the computing device 110 may be a portable or mobile computing device while the computing device 140 may be a server or desktop computer, or vice versa, in some embodiments.

Figure 2:
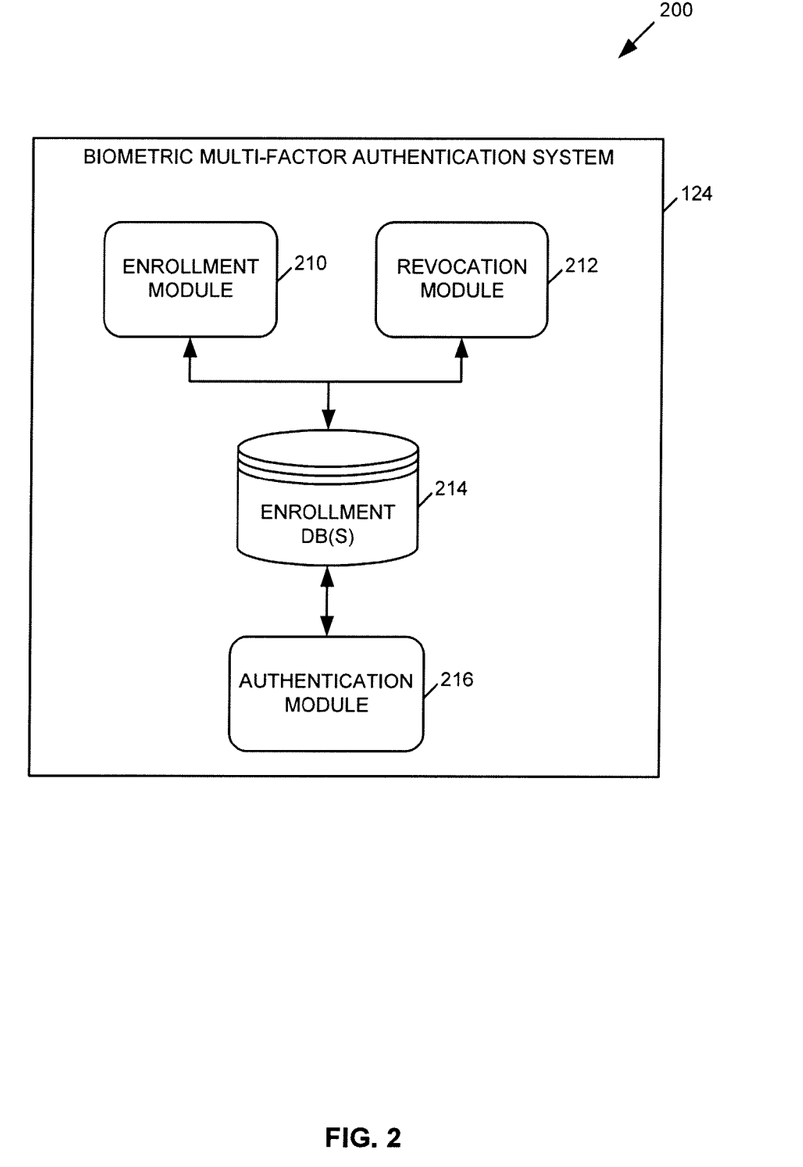
FIG. 2 is a simplified block diagram of at least one embodiment of an environment of the biometric multi-factor authentication system of FIG. 1.

Referring now to FIG. 2, an illustrative embodiment 200 of the system 124 is shown in which the system 124 includes an enrollment module 210, a revocation module 212, and an authentication module 216 that interface with one or more enrollment databases 214 to provide various features of the system 124. As explained in greater detail below with reference to FIG. 3, the enrollment module 210 creates a secure form of a user's identifying credentials (e.g., the biometric user identifier and non-biometric user identifier) from which the user-supplied identifying credentials cannot be easily derived. The revocation module 212 handles the revoking of the user's identifying credentials in cases where, for example, the user is no longer permitted access to protected data or systems or the security of the user's identifying credentials has been compromised. The authentication module 216 uses the secure form of the user's identifying credentials established by the enrollment module 210 to subsequently validate the user's identity (e.g., at various times when the user attempts access to protected data or systems). As described in more detail below, the one or more enrollment databases 214 are embodied as any suitable data structure or other data storage mechanism configured to securely store information relating to the user's identifying credentials, information that may be used to create the secure form of the user's credentials, and/or information that may be used to authenticate or revoke the user's credentials.

Figure 3:
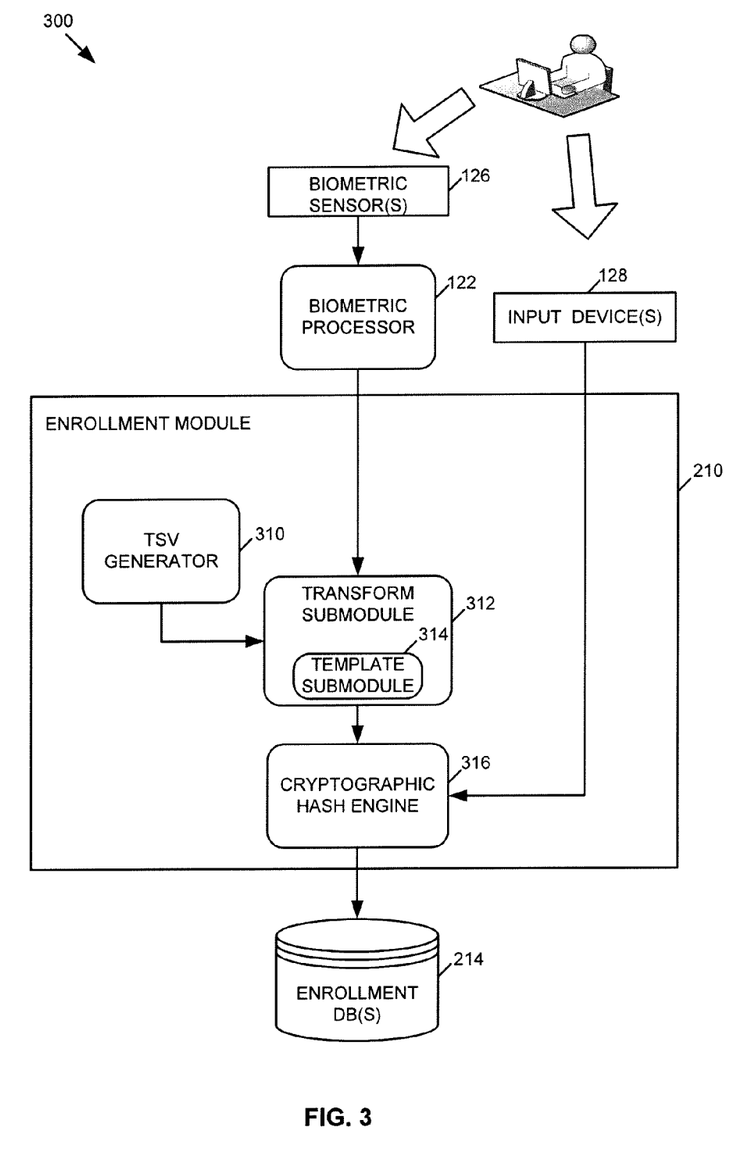
FIG. 3 is a simplified module diagram of at least one embodiment of an enrollment subsystem of the system of FIG. 1.

Referring now to FIG. 3, an illustrative enrollment subsystem 300 of the system 124 is shown. The enrollment subsystem 300 receives identifying credentials supplied by an end user (e.g., the biometric user identifier and the non-biometric user identifier) via the biometric sensor(s) 126, the biometric processor 122, and the input device(s) 128 as described above. In the subsystem 300, the enrollment module 210 includes a transform selector value ("TSV") generator 310, a transform submodule 312, a template submodule 314, and a cryptographic hash engine 316. As explained in greater detail below with reference to FIG. 5, the TSV generator 310 generates the transform selector value, which is used as an input to the transform submodule 312.

The transform submodule 312 executes a transform function using the TSV and the biometric user identifier. The template submodule 314 applies a feature extraction algorithm to the biometric user identifier to create a biometric template ("template"). The template submodule 314 creates the template either before or after the operation of the transform submodule 312. In other words, the transform submodule 312 may apply the transform function to either the "raw" digitized biometric user identifier or a biometric template thereof. In either case, the transform submodule 312 derives a salt from the transformed and templated biometric user identifier. The cryptographic hash engine 316 uses the salt and the non-biometric identifier as inputs to a one-way cryptographic hash function and outputs a secure version of the user's identifying credentials (e.g., a secure hash value), which, along with its corresponding TSV, is stored in one of the secure enrollment database(s) 214.

In some embodiments, the TSV generator 310 generates multiple TSVs, which are then used by the modules 312, 314, 316 to generate multiple secure versions of the user's identifying credentials. In those embodiments, the multiple TSVs and the multiple corresponding secure versions of the identifying credentials are stored in other enrollment databases 214, so as to remain separate from each other for security purposes. Such multiple TSVs and secure credentials can be used by the system 124 to facilitate the revocation of a compromised user identifier and/or the resetting of the user's secure credentials, in some embodiments.

Figure 4:
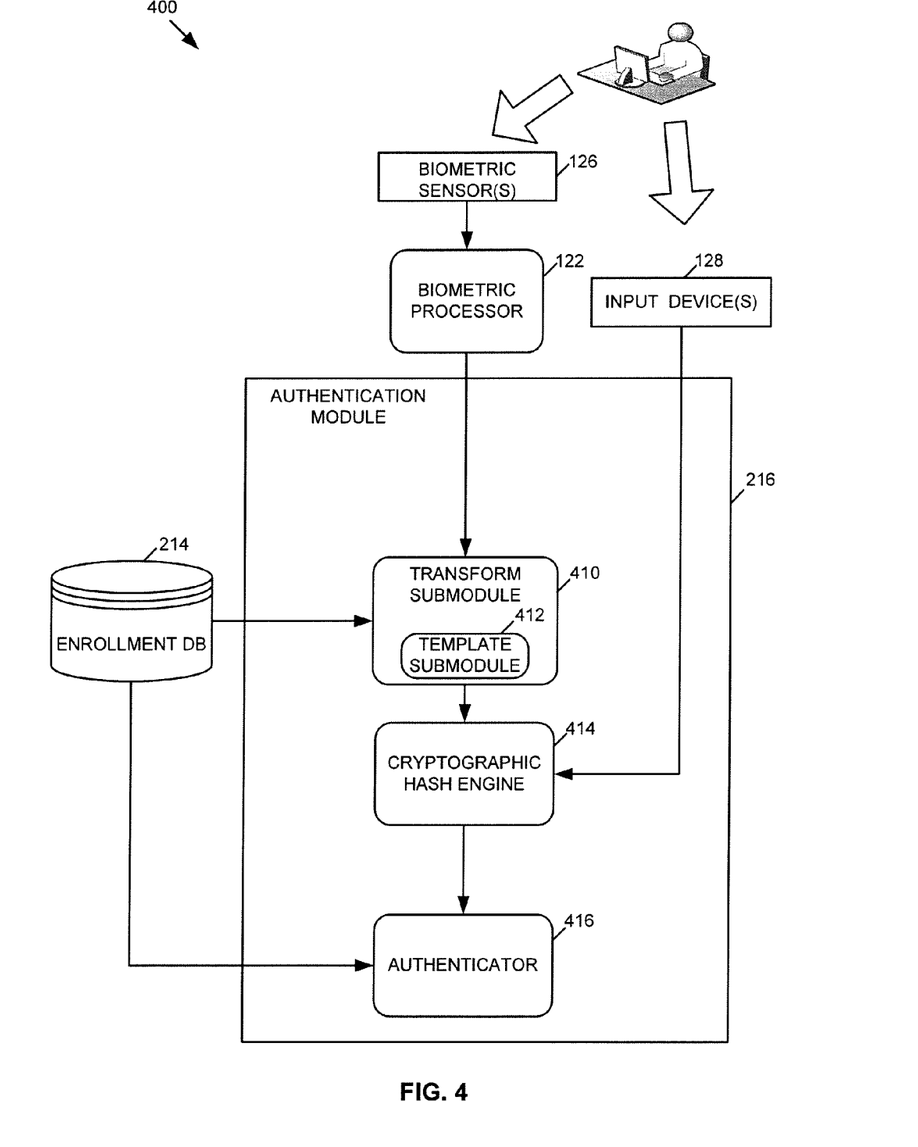
FIG. 4 is a simplified module diagram of at least one embodiment of an authentication subsystem of the system of FIG. 1.

Referring now to FIG. 4, an illustrative authentication subsystem 400 of the system 124 is shown. The authentication subsystem 400 receives a second version of the end user's identifying credentials (e.g., the biometric user identifier and the non-biometric user identifier) via the biometric sensor(s) 126, 156, the biometric processor 122, 152, and the input device(s) 128, 158 as described above. As mentioned above, the second version of the end user's identifying credentials may be obtained when the user attempts to access a protected computer system or sensitive data (e.g., by logging on). In the authentication subsystem 400, the authentication module 216 includes a transform submodule 410, a template submodule 412, a cryptographic hash engine 414, and an authenticator 416. The transform submodule 410, template submodule 412, and cryptographic hash engine 414 operate in a similar fashion to the submodules 312, 314 and cryptographic hash engine 316 described above, except that the TSV is obtained from the enrollment database 214. In other words, the authentication module 216 uses the TSV generated by the enrollment module 210 as input, along with the second instances of the user's biometric and non-biometric identifiers, to the modules 410, 412, 414. Thus, the output of the cryptographic hash engine 414 is a secure version of the second instance of the user's identifying credentials as received by the authentication module 216 (e.g., a second secure hash value). The authenticator 416 performs authentication by comparing (using, e.g., pattern matching or other suitable comparison techniques) the second version of the secure credentials to the original secure credentials created by the enrollment module 210.

Figure 5:
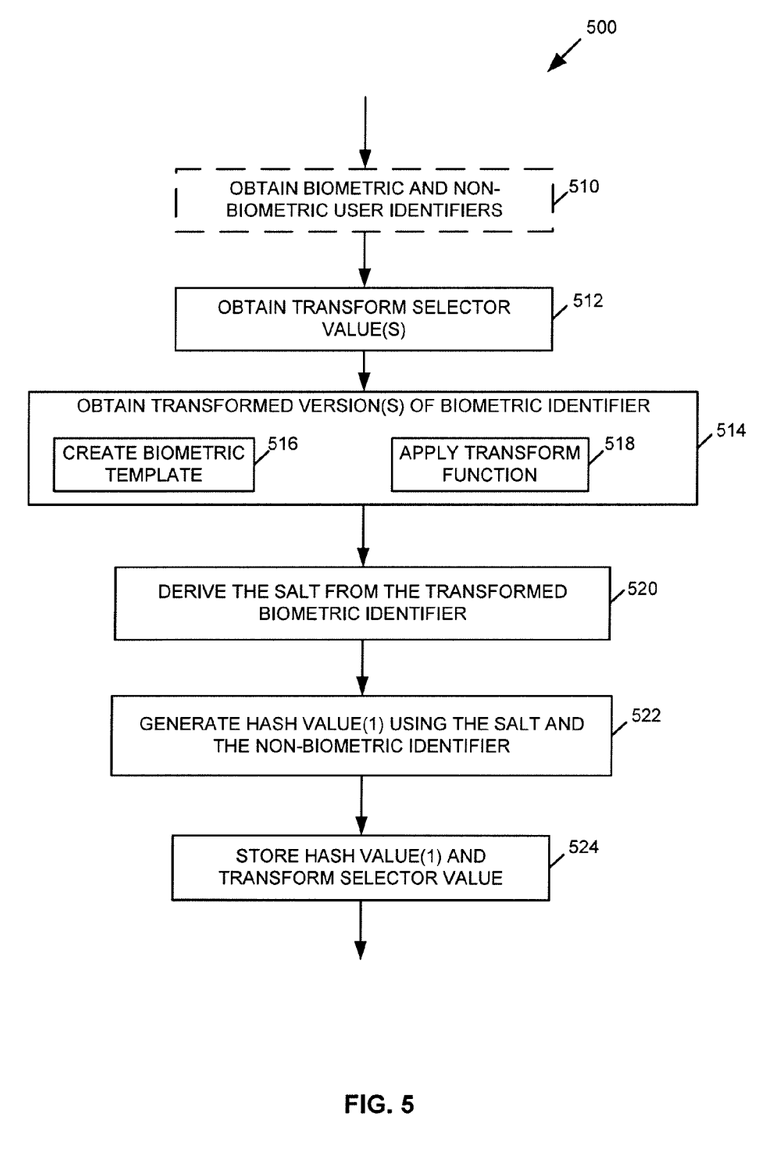
FIG. 5 is a simplified flow diagram of at least one embodiment of a method for establishing a secure multi-factor identifier for a user.

Referring now to FIG. 5, an illustrative method 500 executable as computerized programs, routines, logic and/or instructions by various components of the enrollment module 210, is shown. Block 510 is shown using dashed lines to indicate that its activities are typically performed not by the enrollment module 210 but by the biometric sensor(s) 126, the biometric processor 122, and the input device(s) 128. In any case, an end user's identifying credentials (e.g., biometric user identifier and non-biometric user identifier) are received at block 510.

At block 512, the method 500 generates the one or more transform selector values. In the illustrative embodiments, the TSV(s) are associated with the specific user that has supplied the identifying credentials at block 510, and as such, should be stored in a secure location so as to be kept secret. Further, the TSV(s) are randomly generated by an automated random number generating algorithm, in accordance with the input specifications (e.g., parameter requirements) of the transform function that is applied at block 518, described below. That is, if the transform function requires multiple inputs, then at block 512, the method 500 generates, for each TSV, the number of inputs needed by the transform function.

For example, if the transform function is a two-dimensional Gaussian function, the method 500 randomly generates three parameter values (x,y) (Cartesian coordinates of center of the Gaussian) and r (radius of the center of the Gaussian distribution). In some embodiments, the method 500 may take additional steps to ensure that the randomly generated TSV values comply with the requirements of the selected transform function. For instance, in the Gaussian example, the method 500 may specify to the random number generator that (x,y) can be positive, zero, or negative while r cannot be negative. Further, in some embodiments, the method simply discards any system-generated parameter values that do not meet the requirements of the selected transform function and re-executes the random generator to obtain acceptable TSV values.

At block 514, the method 500 generates the transformed and templated version(s) of the biometric user identifier using the TSV(s) generated at block 512. As noted above, the creating of the biometric template 516 and the applying of the transform function 518 may occur in any order. At block 516, the method 500 creates the template of either the biometric data received at block 510 or the transformed version thereof created at block 518. Generally speaking, the output of block 516 is a feature vector; that is, an n-dimensional vector of numerical values that represent the features of the biometric sample (where n is a positive integer). As noted above, a feature extraction algorithm is used to create the template. Some examples of features than can be extracted from the biometric data to create the template include data identifying unique or distinguishing features of the user's skin texture, fingerprint minutiae, fingerprint or facial orientation, Mel frequency cepstral coefficients (for speech), and/or others. Some examples of feature extraction algorithms include orientation maps, Gabor filters, and independent component analysis algorithms, and/or others.

At block 518, a selected transform function is applied to either the biometric data obtained at block 510 or the template thereof created at block 516, as the case may be, using the TSV generated at block 512. In other words, both the TSV and the biometric data/template are used as input to the transform function. In the illustrative embodiments, the transform function is a repeatable, non-invertible transform function, such as a many-to-one function that transforms a multi-dimensional value into a one-dimensional value. Some examples of transform functions include Gaussian functions (such as the two-dimensional Gaussian function mentioned above), Cartesian, polar, or surface folding transformation functions, and/or others. In embodiments where the transform function operates on the template rather than the raw biometric data, the transform function need not be kept secret.

In some embodiments where multiple secure credentials are generated for a user as described above, the method 500 may select a different transform function to be used to generate each secure credential. Alternatively or in addition, different transform functions may be used to generate the secure credentials for different users or groups of users, in some embodiments. The selection of a transform function may be done in an automated fashion (e.g., by the system 124) or manually (e.g., by a system administrator), in various embodiments.

At block 520, a salt is derived from the transformed biometric identifier generated at block 514. In general, a salt is a fixed-length string value that is combined with another value to form an input to a hash function (e.g., by appending, interleaving, concatenation, etc.). The purpose of the salt is to provide an additional degree of security to the value that is input to the hash function. For example, if the input to the hash function is the user's password, it is possible that multiple users have the same password. Combining the salt with the password produces a different output of the hash function for each user, even if their passwords are the same. The salt may be derived from the transformed biometric identifier using any suitable means. For instance, the method 500 may select a fixed-length portion of the transformed biometric identifier to use as the salt (using, e.g., truncation and/or other techniques). Alternatively, the transform function may be configured so that the transformed biometric identifier generated at block 514 is of a fixed size (e.g. $2^{16}$ bits). In that case, the entire transformed biometric identifier or a portion thereof may be used as the salt. In embodiments where multiple TSVs are generated, a salt may be generated corresponding to each TSV.

At block 522, the method 500 combines the salt with the non-biometric user identifier and executes a cryptographic hash function using the combination of the salt and non-biometric user identifier as input. The salt and the non-biometric user identifier may be combined according to requirements or specifications of the selected cryptographic hash function (e.g., length, block size, etc.). For example, the salt may be concatenated with the non-biometric user identifier either at the beginning or the end of the non-biometric user identifier, or the binary representations of the salt and the non-biometric user identifier may be randomly interleaved.

In general, a cryptographic hash function is a one-way function that converts a string value of arbitrary length (e.g., the salt and non-biometric user identifier combination) to a fixed-length value. The output of the cryptographic hash function is a secure hash value, from which the user's identifying credentials cannot be easily derived. Any suitable cryptographic hash algorithm may be used, such as any of the Secure Hash Algorithms, the MD5 algorithm, and/or others. In embodiments where multiple TSVs are generated, and thus multiple corresponding salts, the cryptographic hash function may be executed on each combination of salt and non-biometric user identifier, thereby generating multiple secure hash values.

The secure hash value(s) and the TSV(s) used as input to the transform function should be kept secret and are thus stored securely in the enrollment database 214 (or a highly secure portion thereof) at block 524. To revoke a user's current set of identifying credentials, the associated secure credential (e.g., hash value) and its corresponding TSV are simply deleted from the enrollment database 214, and new values are generated by performing the method 500 again or, in embodiments where multiple such values have been previously securely stored, simply obtaining the new values from the secure storage. As noted above, the user may use the same biometric feature to create new secure credentials in the event a previous version of his or her secure credentials needs to be revoked.

Figure 6:
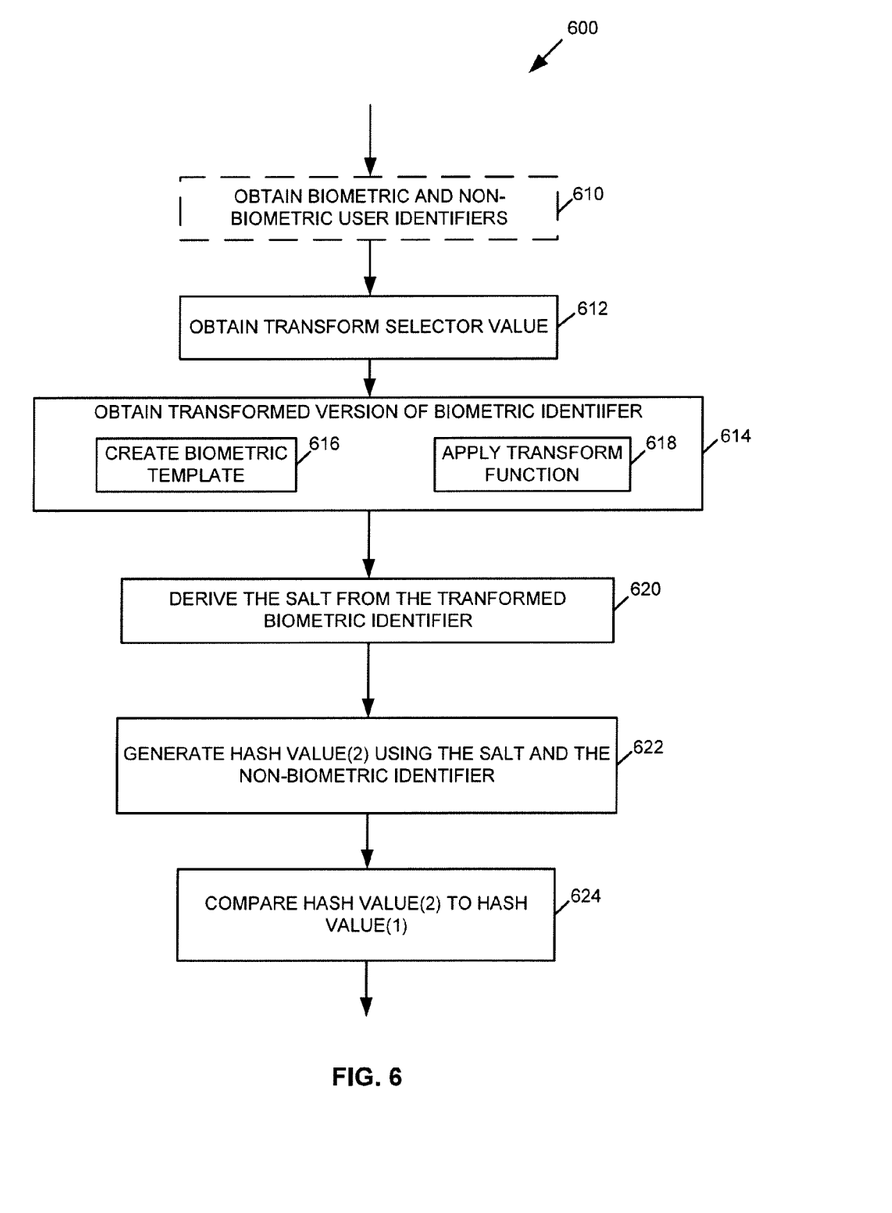
FIG. 6 is a simplified flow diagram of at least one embodiment of a method for authenticating a user based on biometric data.

Referring now to FIG. 6, an illustrative method 600 executable as computerized programs, routines, logic and/or instructions by various components of the authentication module 216, is shown. Block 610 is shown using dashed lines to indicate that its activities are typically performed not by the authentication module 216 but by the biometric sensor(s) 126, 156, the biometric processor 122, 152, and the input device(s) 128, 158. In any case, a second instance of the end user's identifying credentials (e.g., biometric user identifier and non-biometric user identifier) are received at block 610. At block 612, the transform selector value assigned to the user (via, e.g., an association with the user's computer user ID) is obtained from its secure storage location (e.g., an enrollment database 214). The TSV obtained at block 612 is used, with the second instance of the user's identifying credentials obtained at block 610, by blocks 614, 616, 618, 620, and 622 to generate a second instance of the user's secure credential. In other words, blocks 614, 616, 618, 620, and 622 operate similarly to blocks 514, 516, 518, 520, and 522 described above; thus, the description thereof is not repeated. The second instance of the user's secure credential (e.g., the second hash value) is compared with the secure credential stored for the user (and associated therewith by, e.g., a user ID) in the enrollment database 214. The results of the comparison of the secure credential generated at block 622 with the secure credential generated at block 524 are used by the system 124 to authenticate the user; that is, to determine whether the identifying credentials obtained at block 610 are valid. For instance, the method 600 may determine that the authentication has been successful if the comparison indicates that the values match, and that the authentication has not been successful if the comparison indicates that the two values do not match.

EXAMPLES

Illustrative examples of the devices, systems, and methods disclosed herein are provided below. An embodiment of the devices, systems, and methods may include any one or more, and any combination of, the examples described below.

Example 1 includes a computing device for enabling biometric multi-factor authentication. The computing device includes a transform selector value generator to generate a transform selector value; a transform module to generate a salt for a cryptographic hash function based on the transform selector value and the biometric user identifier; and a cryptographic hash engine to generate a hash value based on the salt and the non-biometric user identifier.

Example 2 includes the subject matter of Example 1, and further includes an input/output subsystem to obtain a biometric user identifier and the non-biometric user identifier.

Example 3 includes the subject matter of any of Examples 1 and 2, and wherein the transform module comprises a transform module to execute a repeatable non-invertible transform function using the biometric user identifier and the transform selector value as inputs.

Example 4 includes the subject matter of any of Examples 1-3, and wherein the transform module comprises a transform module to select the repeatable non-invertible transform function from a group of transform functions comprising Gaussian functions, Cartesian, polar, or surface folding transformation functions, and other functions that transform multi-dimensional values to single-dimension values.

Example 5 includes the subject matter of any of Examples 1-4, and further including a template module to generate a biometric template from the biometric user identifier, wherein the biometric template comprises one or more features extracted from the biometric user identifier.

Example 6 includes the subject matter of any of Examples 1-5, and wherein the template module comprises a template module to execute a feature extraction algorithm using the biometric user identifier as input.

Example 7 includes the subject matter of any of Examples 1-6, and wherein the template module comprises a template module to select the feature extraction algorithm from a group of algorithms comprising orientation maps, Gabor filters, independent component analysis algorithms, and other feature extraction algorithms.

Example 8 includes the subject matter of any of Examples 1-7, and wherein the transform module comprises a transform module to generate a transformed version of the biometric user identifier and the template module comprises a template module to generate the biometric template using the transformed version of the biometric user identifier as input.

Example 9 includes the subject matter of any of Examples 1-8, and wherein the template module comprises a template module to generate the biometric template using the biometric identifier as input and the transform module comprises a transform module to generate a transformed version of the biometric user identifier using the biometric template as input.

Example 10 includes the subject matter of any of Examples 1-9, and further includes a database to store the transform selector value and the hash value.

Example 11 includes the subject matter of any of Examples 1-10, and wherein the salt and the biometric user identifier are not stored in the database.

Example 12 includes the subject matter of any of Examples 1-11, and wherein the transform module comprises a transform module to execute a transform function using the biometric user identifier, and the transform selector value generator comprises a transform selector value generator to generate the transform selector value according to specifications associated with the transform function.

Example 13 includes the subject matter of any of Examples 1-12, and wherein the transform selector value generator comprises a random number generator.

Example 14 includes the subject matter of any of Examples 1-13, and further includes a cryptographic hash engine to execute a cryptographic hash function and combine the salt and the non-biometric identifier according to at least one specification of the cryptographic hash function.

Example 15 includes the subject matter of any of Examples 1-14, and further includes a plurality of databases to store a plurality of transform selector values, wherein at least one of the transform selector values is stored separately from the other transform selector values.

Example 16 includes the subject matter of any of Examples 1-15, and wherein the transform module comprises a transform module to generate a plurality of salts, wherein each salt is generated using one of the transform selector values as input.

Example 17 includes the subject matter of any of Examples 1-16, and wherein the cryptographic hash engine comprises a cryptographic hash engine to generate a plurality of hash values, wherein each hash value is generated using one of the salts as input.

Example 18 includes the subject matter of any of Examples 1-17, and wherein at least one of the hash values is stored separately from the other hash values.

Example 19 includes a method for multi-factor authentication with a computing device. The method includes generating a transform selector value; generating a first instance of a salt for a cryptographic hash function based on the transform selector value and a first instance of a biometric user identifier; and generating a first hash value based on the first instance of the salt and a first instance of a non-biometric user identifier.

Example 20 includes the subject matter of claim 19, and further includes storing the transform selector value and the first hash value in an enrollment database.

Example 21 includes the subject matter of any of Examples 19 and 20, and further includes generating a second hash value and comparing the second hash value to the first hash value.

Example 22 includes the subject matter of any of Examples 19-21, and further includes generating the second hash value based on the transform selector value and a second instance of the biometric user identifier.

Example 23 includes the subject matter of any of Examples 19-22, and further includes generating the second hash value based on a second instance of the non-biometric user identifier.

Example 24 includes the subject matter of any of Examples 19-23, and wherein the transform selector value, the first instance of the biometric user identifier, and the first instance of the non-biometric user identifier comprise a multi-factor user identifier, and the method comprises revoking the multi-factor user identifier without requiring the biometric user identifier or the non-biometric user identifier to be changed.

Example 25 includes the subject matter of any of Examples 19-24, and further includes storing the transform selector value and the first hash value in an enrollment database, wherein revoking the multi-factor user identifier comprises deleting the transform selector value and the first hash value from the enrollment database.

Example 26 includes a computing device having a processor and a memory having stored therein a plurality of instructions that when executed by the processor cause the mobile digital information display device to perform the method of any of Examples of 19-25.

Example 27 includes one or more machine-readable storage media comprising a plurality of instructions stored thereon that in response to being executed result in a computing device performing the method of any of Examples 19-25.

Example 28 includes one or more machine-readable storage media comprising a plurality of instructions stored thereon that in response to being executed result in a computing device receiving a biometric user identifier and a non-biometric user identifier; generating a transform selector value; and generating a salt for a cryptographic hash function based on the biometric user identifier and the transform selector value.

Example 29 includes the subject matter of Example 28, and wherein generating the transform selector value comprises randomly generating a transform selector value.

Example 30 includes the subject matter of any of Examples 28 and 29, and further including generating a hash value based on the salt and the non-biometric user identifier.

Example 31 includes the subject matter of any of Examiners 28-30, and further includes comparing the hash value to a second hash value, wherein the second hash value is based on the transform selector value, a second instance of the biometric user identifier, and a second instance of the non-biometric user identifier.

The invention claimed is:

1. A computing device for enabling biometric multi-factor authentication comprising:
   a transform selector value generator to generate a transform selector value;
   a transform module to generate a salt to be used as input to a cryptographic hash function, the transform module generating the salt by:
      executing a mathematical transform function using the transform selector value and a biometric user identifier as inputs to create a transformed biometric identifier; and
      deriving the salt from the transformed biometric identifier; and
   a cryptographic hash engine to generate a hash value using the salt derived from the transformed biometric identifier and a non-biometric user identifier as inputs.

2. The computing device of claim 1, further comprising an input/output subsystem to obtain the biometric user identifier and the non-biometric user identifier.

3. The computing device of claim 1, wherein the transform module comprises a transform module to execute a repeatable non-invertible transform function using the biometric user identifier and the transform selector value as inputs.

4. The computing device of claim 3, wherein the transform module comprises a transform module to select the repeatable non-invertible transform function from a group of transform functions comprising Gaussian functions, Cartesian, polar, or surface folding transformation functions, and other functions that transform multi-dimensional values to single-dimension values.

5. The computing device of claim 1, further comprising a template module to generate a biometric template from the biometric user identifier, wherein the biometric template comprises one or more features extracted from the biometric user identifier.

6. The computing device of claim 5, wherein the template module comprises a template module to execute a feature extraction algorithm using the biometric user identifier as input.

7. The computing device of claim 5, wherein the template module comprises a template module to select the feature extraction algorithm from a group of algorithms comprising orientation maps, Gabor filters, independent component analysis algorithms, and other feature extraction algorithms.

8. The computing device of claim 5, wherein the template module comprises a template module to generate the biometric template using the transformed version of the biometric user identifier as input.

9. The computing device of claim 5, wherein the template module comprises a template module to generate the biometric template using the biometric identifier as input and the transform module comprises a transform module to generate a transformed version of the biometric user identifier using the biometric template as input.

10. The computing device of claim 1, further comprising a database to store the transform selector value and the hash value.

11. The computing device of claim 10, wherein the salt and the biometric user identifier are not stored in the database.

12. The computing device of claim 1, wherein the transform selector value generator comprises a transform selector value generator to generate the transform selector value according to specifications associated with the transform function.

13. The computing device of claim 1, wherein the transform selector value generator comprises a random number generator.

14. The computing device of claim 1, further comprising a cryptographic hash engine to execute a cryptographic hash function and combine the salt and the non-biometric identifier according to at least one specification of the cryptographic hash function.

15. The computing device of claim 1, further comprising a plurality of databases to store a plurality of transform selector values, wherein at least one of the transform selector values is stored separately from the other transform selector values.

16. The computing device of claim 15, wherein the transform module comprises a transform module to generate a plurality of salts, wherein each salt is generated using one of the transform selector values as input.

17. The computing device of claim 15, wherein the cryptographic hash engine comprises a cryptographic hash engine to generate a plurality of hash values, wherein each hash value is generated using one of the salts as input.

18. The computing device of claim 16, wherein at least one of the hash values is stored separately from the other hash values.

19. A method for multi-factor authentication with a computing device, the method comprising:
   generating a transform selector value;
   executing a mathematical transform function using the transform selector value and a biometric user identifier as inputs to create a transformed biometric identifier;

generating a first instance of a salt to be used as input to a cryptographic hash function, the salt derived from the transformed biometric identifier; and generating a first hash value using the first instance of the salt derived from the transformed biometric identifier and a first instance of a non-biometric user identifier as inputs.

20. The method of claim 19, further comprising storing the transform selector value and the first hash value in an enrollment database.

21. The method of claim 19, further comprising generating a second hash value and comparing the second hash value to the first hash value.

22. The method of claim 21, further comprising generating the second hash value based on the transform selector value and a second instance of the biometric user identifier.

23. The method of claim 22, further comprising generating the second hash value based on a second instance of the non-biometric user identifier.

24. The method of claim 19, wherein the transform selector value, the first instance of the biometric user identifier, and the first instance of the non-biometric user identifier comprise a multi-factor user identifier, and the method comprises revoking the multi-factor user identifier without requiring the biometric user identifier or the non-biometric user identifier to be changed.

25. The method of claim 24, further comprising storing the transform selector value and the first hash value in an enrollment database, wherein revoking the multi-factor user identifier comprises deleting the transform selector value and the first hash value from the enrollment database.

26. One or more non-transitory machine-readable storage media comprising a plurality of instructions stored thereon that in response to being executed result in a computing device:

receiving a biometric user identifier and a non-biometric user identifier;

generating a transform selector value;

executing a mathematical transform function using the transform selector value and a biometric user identifier as inputs to create a transformed biometric identifier generating a salt to be used as input to a cryptographic hash function, the salt derived from the transformed biometric identifier; and generating a hash value using the salt derived from the transformed biometric identifier and the non-biometric user identifier as inputs.

27. The one or more machine-readable storage media of claim 26, wherein generating the transform selector value comprises randomly generating a transform selector value.

28. The one or more machine-readable storage media of claim 26, comprising comparing the hash value to a second hash value, wherein the second hash value is based on the transform selector value, a second instance of the biometric user identifier, and a second instance of the non-biometric user identifier.

29. A computing device for enabling biometric multi-factor authentication comprising:

a transform selector value generator to generate a transform selector value;

a transform module to generate a salt to be used as input to a cryptographic hash function, the transform module generating the salt using the transform selector value and a biometric user identifier as inputs; and a cryptographic hash engine to generate a hash value using the salt and a non-biometric user identifier as inputs, wherein the transform module is to execute a transform function to generate the salt, and the transform selector value generator is to generate the transform selector value by determining a number of inputs required by the transform function and generating, for the transform selector value, the number of inputs required by the transform function.

30. The computing device of claim 1, wherein the transform module is to execute a transform function to generate the salt, and the transform selector value generator is to determine a requirement of the transform function and verify that the transform selector value complies with the requirement of the transform function.

31. The computing device of claim 1, wherein the transform module is to generate the salt by executing a non-cryptographic transform function using the transform selector value and the biometric user identifier as inputs.

32. The computing device of claim 1, wherein the transform module is to select a transform function from a plurality of transform functions and execute the selected transform function using the transform selector value and the biometric user identifier as inputs.

* * * * *